E. J. PRESTON
Harrow.
No. 96,836.  Patented Nov. 16, 1869.
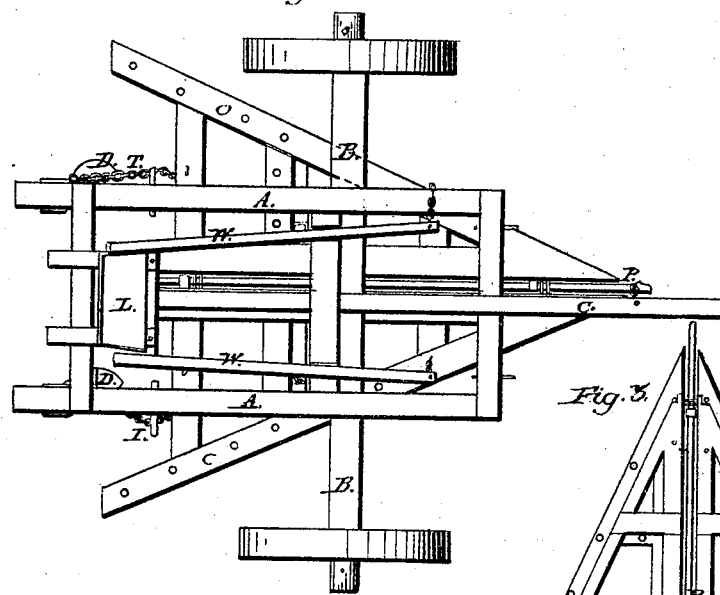
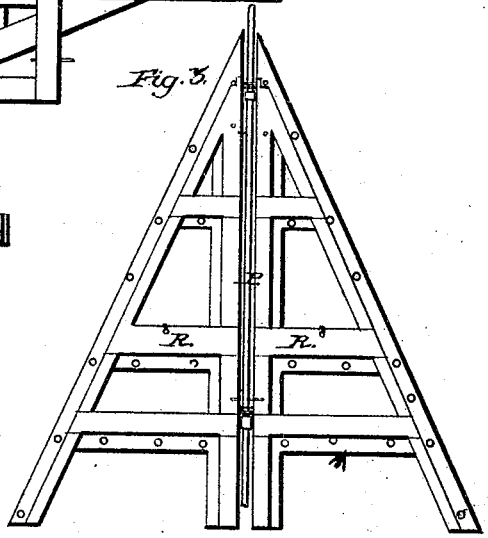
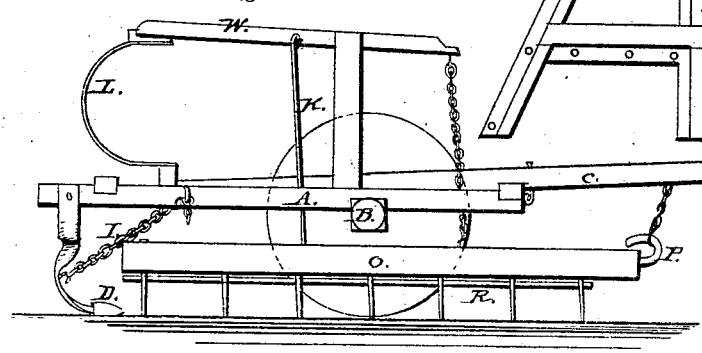
Witnesses:
Cornelius Cox
Leopold Evert
Inventor:
Elijah J. Preston
Alexander & Mason
attorneys.

United States Patent Office.

ELIJAH J. PRESTON, OF EUREKA, MISSOURI.

Letters Patent No. 96,836, dated November 16, 1869; antedated November 1, 1869.

IMPROVEMENT IN HARROWS.

The Schedule referred to in these Letters Patent and making part of the same.

To all whom it may concern:

Be it known that I, ELIJAH J. PRESTON, of Eureka, in the county of St. Louis, and in the State of Missouri, have invented certain new and useful Improvements in Harrows; and do hereby declare that the following is a full, clear, and exact description thereof, reference being had to the accompanying drawings, and to the letters of reference marked thereon.

The object of my invention is not only to provide a good, serviceable harrow, which can be easily managed, but one which can be made to clean itself when the teeth become filled and clogged.

Figure 1 is a plan view of my harrow.
Figure 2 is a side elevation of the same.
Figure 3 is a bottom view of the harrow.

Letter A represents the frame of my harrow, which can be made of any desirable shape or size, and is supported upon the axle B.

Secured to this axle, and resting upon the cross-piece at the end of the frame, is the tongue C, which extends to some distance back, and has the seat L placed upon its end.

Pivoted to each side of the frame, at its back, is a plowshare, D, which are so arranged that when not wanted for plowing they can be drawn up and secured by means of the chain I.

Hung to the frame A, by the means of short chains, is the harrow O, which is divided into two parts, and hinged together by means of the rod P.

Secured to the bottom of the harrow there are two frames, of the same shape as the parts of the harrow, and have their inner sides hinged on, allowing the outer ones to be depressed by means of the rod K, attached to the levers W, for the purpose of freeing the teeth from sticks, grass, &c., which clog them up.

Secured to the beam B are two uprights or standards, which are braced by means of a cross-piece, and to which the two levers W are pivoted. The front ends of these levers are attached to the harrow by means of chains, so that either side can be lowered or raised so as to suit the inequalities of the ground.

When it is desired to use the plows only, the harrow can be raised entirely clear of the ground, by means of small chains, which are attached to the frame for that purpose.

Having thus described my invention,

What I claim, and desire to secure by Letters Patent, is—

1. The within-described device for cleaning the harrow, when used in the manner and for the purpose set forth.

2. In combination with the cleaners R, the divided harrow O, lever W, rod K, and plows D, when used in the manner and for the purpose set forth.

In testimony that I claim the foregoing, I have hereunto set my hand, this 10th day of March, 1869.

ELIJAH J. PRESTON.

Witnesses:
AUGUSTINE METZ,
LEOPOLD EVERT.